United States Patent
Koike

(10) Patent No.: US 12,323,095 B2
(45) Date of Patent: Jun. 3, 2025

(54) SOLAR POWER GENERATION SYSTEM AND CONTROL DEVICE

(71) Applicant: TOSHIBA MITSUBISHI-ELECTRIC INDUSTRIAL SYSTEMS CORPORATION, Tokyo (JP)

(72) Inventor: Hirokazu Koike, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 0 days.

(21) Appl. No.: 18/555,547

(22) PCT Filed: Feb. 28, 2022

(86) PCT No.: PCT/JP2022/008289
§ 371 (c)(1),
(2) Date: Oct. 16, 2023

(87) PCT Pub. No.: WO2023/162222
PCT Pub. Date: Aug. 31, 2023

(65) Prior Publication Data
US 2024/0204720 A1 Jun. 20, 2024

(51) Int. Cl.
*H02S 40/32* (2014.01)
*H02J 3/38* (2006.01)
*H02S 50/00* (2014.01)

(52) U.S. Cl.
CPC .............. *H02S 40/32* (2014.12); *H02J 3/381* (2013.01); *H02S 50/00* (2013.01); *H02J 2300/24* (2020.01)

(58) Field of Classification Search
None
See application file for complete search history.

(56) References Cited

U.S. PATENT DOCUMENTS

2012/0205985 A1* 8/2012 Inakagata ................. H02J 3/46
307/82
2016/0329716 A1* 11/2016 Inoue ...................... H02M 7/44

FOREIGN PATENT DOCUMENTS

JP 2013-126260 A 6/2013
JP 2013-207862 A 10/2013
(Continued)

OTHER PUBLICATIONS

International Search Report and Written Opinion mailed on Mar. 29, 2022, received for PCT Application PCT/JP2022/008289, filed on Feb. 28, 2022, 12 pages including English Translation.
(Continued)

*Primary Examiner* — Eli S Mekhlin
(74) *Attorney, Agent, or Firm* — XSENSUS LLP

(57) ABSTRACT

A solar power generation system includes solar cell panels, power conversion devices, and a control device; the plurality of power conversion devices convert direct current power supplied from the plurality of solar cell panels into alternating current power corresponding to a power system, the plurality of power conversion devices supply, to the power system, the alternating current power; the control device includes a total output value calculation part, a difference calculation part, and an upper limit command value calculation part, the total output value calculation part is configured to calculate a total active power value indicating a magnitude of currently-outputtable active power from all of the plurality of power conversion devices, the difference calculation part is configured to calculate a difference between a total upper limit command value and the total active power value, and calculate a difference per device of the plurality of power conversion devices.

6 Claims, 3 Drawing Sheets

(56) References Cited

FOREIGN PATENT DOCUMENTS

| JP | 2017-118721 A | 6/2017 |
|----|---------------|--------|
| JP | 2020-043642 A | 3/2020 |

OTHER PUBLICATIONS

Office Action issued on Aug. 1, 2024, in corresponding Japanese patent Application No. 2024-502742, 6 pages.

* cited by examiner

SOLAR POWER GENERATION SYSTEM AND CONTROL DEVICE

CROSS-REFERENCE TO RELATED APPLICATION

The present application is based on PCT filing PCT/JP2022/008289, filed Feb. 28, 2022, the entire contents of which are incorporated herein by reference.

FIELD

Embodiments described herein relate generally to a solar power generation system and a control device.

BACKGROUND ART

A known solar power generation system includes multiple solar cell panels, multiple power conversion devices, and a control device. The multiple power conversion devices are provided to correspond respectively to the multiple solar cell panels. The power conversion devices are connected to the solar cell panels and connected to a power system. The power conversion devices convert DC power supplied from the solar cell panels into AC power corresponding to the power system and supply, to the power system, the AC power after the conversion. The control device controls the conversion operations of the power of the multiple power conversion devices.

In a solar power generation system, the upper limit of the active power outputtable to the power system is predetermined to suppress fluctuation of the frequency and/or voltage of the power system. The control device controls the operations of the multiple power conversion devices so that the total value of the active power of the AC power output from the multiple power conversion devices does not exceed the upper limit.

The control device calculates the individual upper limit of each of the multiple power conversion devices by dividing the upper limit of the active power of the entire system by the number of the multiple power conversion devices, and sets the active power of the AC power of each of the multiple power conversion devices to be not more than the individual upper limit. Accordingly, the total value of the active power of the AC power output from the multiple power conversion devices can be set to be not more than the upper limit of the active power of the entire system.

When, however, the individual upper limit of each of the multiple power conversion devices is set as described above, the total value of the active power of the AC power supplied from the multiple power conversion devices to the power system is undesirably limited more than necessary when, for example, an upper limit that is less than the rated output of the system is set, the solar radiation of the multiple solar cell panels has bias, etc.

If, for example, there are two power conversion devices, and the upper limit of the active power of the entire system is 10 kW, in such a case, the individual upper limit would be set to 5 kW in the calculation method described above. Then, if the active power outputtable by one power conversion device is 6 kW and the active power outputtable by the other power conversion device is 4 kW, the active power of the one power conversion device would be undesirably limited by the individual upper limit from 6 kW to 5 KW, resulting in an output to the power system of a total of only 9 kW of active power even though 10 KW of active power is outputtable as the entire system.

Thus, when the individual upper limits are calculated as described above, the total value of the active power of the AC power supplied from the multiple power conversion devices to the power system may be limited more than necessary. For example, generated power is unutilized. Also, in a solar power generation system business, for example, this would lead to lower electricity sales income.

It is therefore desirable for a solar power generation system and a control device used in a solar power generation system to be able to suppress excessive limitation of the total value of the active power of the AC power supplied from the multiple power conversion devices to the power system.

PRIOR ART DOCUMENTS

Patent Documents

[Patent Document 1]
  JP-A-2013-207862

SUMMARY OF INVENTION

Technical Problem

Embodiments of the invention provide a solar power generation system and a control device in which unnecessary limitation of the total value of the active power of the AC power supplied from the multiple power conversion devices to the power system can be suppressed.

Solution to Problem

A solar power generation system provided according to an embodiment of the invention includes a plurality of solar cell panels, a plurality of power conversion devices, and a control device; the plurality of power conversion devices is provided to correspond respectively to the plurality of solar cell panels, the plurality of power conversion devices convert direct current power supplied from the plurality of solar cell panels into alternating current power corresponding to a power system, the plurality of power conversion devices supply, to the power system, the alternating current power after the conversion; the control device controls conversion operations of power of the plurality of power conversion devices, the control device includes a total output value calculation part, a difference calculation part, and an upper limit command value calculation part, the total output value calculation part is configured to receive an input of an active power value indicating a magnitude of currently-outputtable active power for each of the plurality of power conversion devices, and calculate a total active power value by summing the active power values of the plurality of power conversion devices, the total active power value indicates a magnitude of currently-outputtable active power from all of the plurality of power conversion devices, the difference calculation part is configured to receive an input of the total active power value, receive an input of a total upper limit command value indicating an upper limit of active power output from all of the plurality of power conversion devices, calculate a difference between the total upper limit command value and the total active power value, and calculate a difference per device of the plurality of power conversion devices by dividing the difference by a number of the plurality of power conversion devices, and the upper limit command value calculation part is configured to receive an input of the difference per device, receive an input of the active power values of the plurality of power conversion devices, and calculate individual upper limit command values by adding the difference per device to the active power values of the plurality of power conversion devices, the individual upper limit command values indicates upper limits of the active power individually output respectively from the plurality of power conversion devices, the control device controls an operation of each of the plurality of power conversion devices so that the active power output from each of the plurality of power conversion devices does not exceed the corresponding individual upper limit command value.

Advantageous Effects of Invention

According to embodiments of the invention, a solar power generation system and a control device are provided in which unnecessary limitation of the total value of the active power of the AC power supplied from the multiple power conversion devices to the power system can be suppressed.

DESCRIPTION OF EMBODIMENTS

Figure 1:
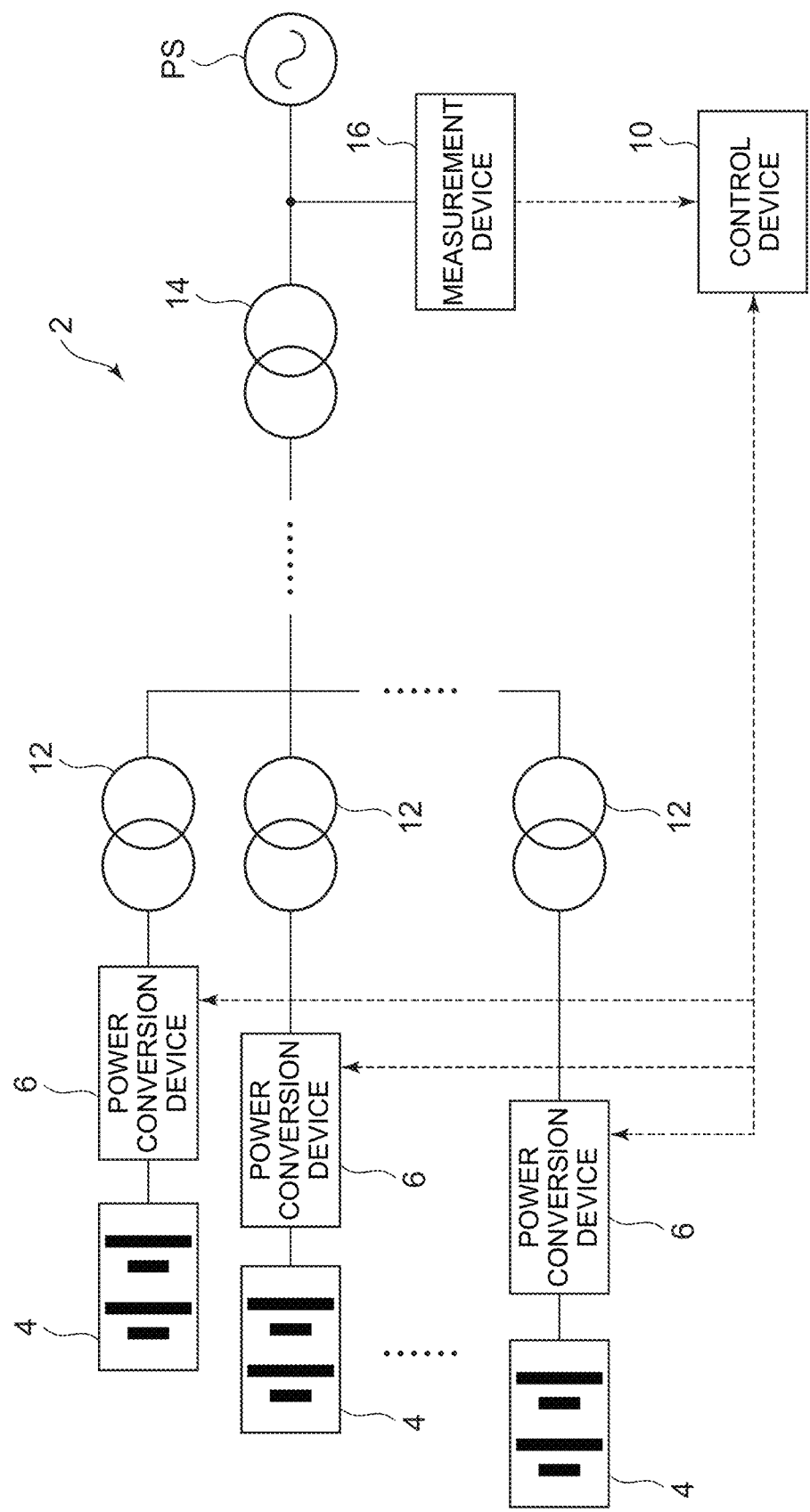
FIG. 1 is a block diagram schematically illustrating a solar power generation system according to an embodiment.

Embodiments will now be described with reference to the drawings.

The drawings are schematic and conceptual; and the relationships between the thicknesses and widths of portions, the proportions of sizes among portions, etc., are not necessarily the same as the actual values. Also, the dimensions and proportions may be illustrated differently among drawings, even for identical portions.

In the specification and drawings, components similar to those described previously or illustrated in an antecedent drawing are marked with the same reference numerals; and a detailed description is omitted as appropriate.

FIG. 1 is a block diagram schematically illustrating a solar power generation system according to an embodiment.

As illustrated in FIG. 1, the solar power generation system 2 includes multiple solar cell panels 4, multiple power conversion devices 6, and a control device 10. The multiple solar cell panels 4 supply DC power by converting light energy into electrical energy by photoelectric conversion.

The multiple power conversion devices 6 are provided to correspond respectively to the multiple solar cell panels 4. The number of the multiple power conversion devices 6 is, for example, equal to the number of the multiple solar cell panels 4. The multiple power conversion devices 6 are connected respectively to the multiple solar cell panels 4. However, multiple solar cell panels 4 may be connected to one power conversion device 6. The number of the multiple power conversion devices 6 may not always be equal to the number of the multiple solar cell panels 4.

The solar power generation system 2 further includes, for example, multiple transformers 12 and a transformer 14. The multiple transformers 12 are provided to correspond respectively to the multiple power conversion devices 6. The multiple power conversion devices 6 are connected to the primary sides of the multiple transformers 12. The secondary sides of the multiple transformers 12 are connected to the primary side of the transformer 14. The secondary side of the transformer 14 is connected to a power system PS. The multiple power conversion devices 6 are connected with the power system PS via the transformers 12 and 14, etc. Circuit breakers, more transformers, etc., may be located between the power system PS and the power conversion devices 6. The configuration between the power system PS and the power conversion devices 6 may be any configuration that can connect the power conversion devices 6 to the power system PS.

The power of the power system PS is AC power. The power of the power system PS is, for example, three-phase AC power. However, the power of the power system PS may be single-phase AC power, etc.

The multiple power conversion devices 6 convert DC power supplied from the multiple solar cell panels 4 into AC power corresponding to the power system PS and supply, to the power system PS, the AC power after the conversion. The multiple power conversion devices 6 include, for example, multiple switching elements and convert the power by switching the multiple switching elements.

The control device 10 controls the conversion operations of the power of the multiple power conversion devices 6. Accordingly, the solar power generation system 2 supplies the power generated by the multiple solar cell panels 4 to the power system PS.

The solar power generation system 2 further includes, for example, a measurement device 16. For example, the measurement device 16 detects the active power value, the reactive power value, and the voltage value at the connection point between the power system PS and the multiple power conversion devices 6 and inputs the active power value, the reactive power value, and the voltage value that are detected to the control device 10.

Figure 2:
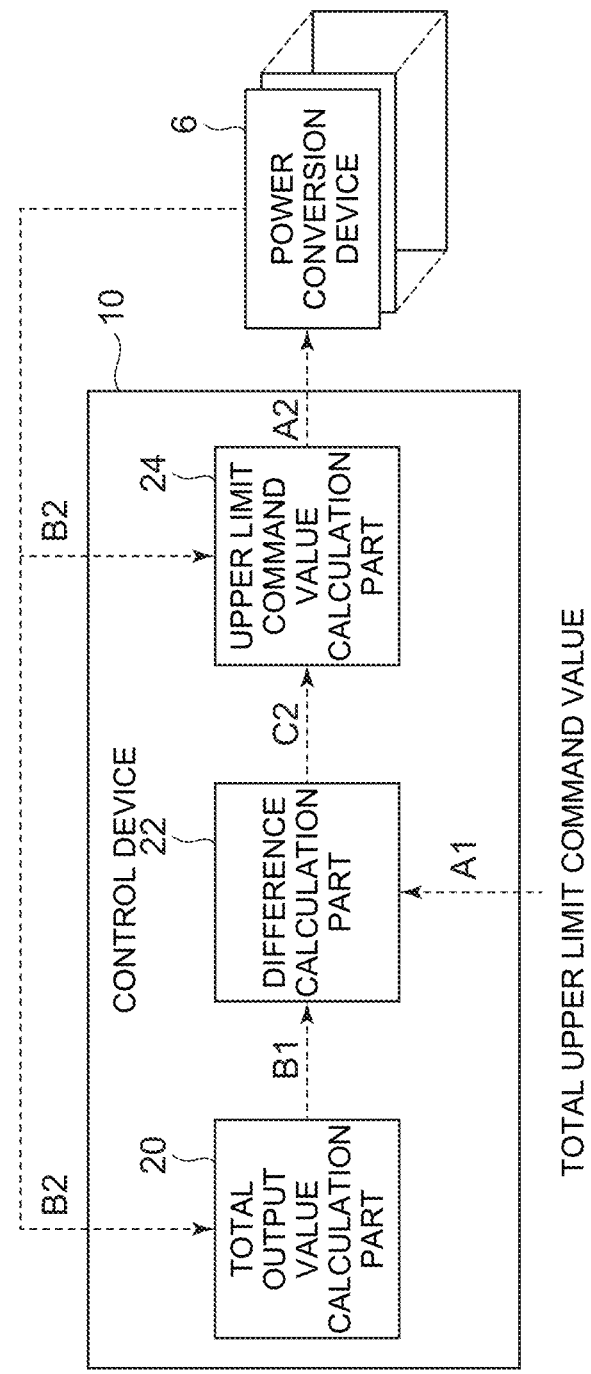
FIG. 2 is a block diagram schematically illustrating the control device according to the embodiment.

FIG. 2 is a block diagram schematically illustrating the control device according to the embodiment.

As illustrated in FIG. 2, the control device 10 includes a total output value calculation part 20, a difference calculation part 22, and an upper limit command value calculation part 24.

The total output value calculation part 20 receives the input of an active power value B2 indicating the magnitude of the currently-outputtable active power for each of the multiple power conversion devices 6. For example, the control device 10 receives the input of the active power values B2 from the multiple power conversion devices 6 by communicating with the multiple power conversion devices 6. For example, the multiple active power values B2 of the multiple power conversion devices 6 may be input to the control device 10 from a higher-level controller, etc. The method for inputting the multiple active power values B2 to the control device 10 is not limited to that described above and may be any method that can appropriately input the multiple active power values B2 to the control device 10.

The total output value calculation part 20 calculates a total active power value B1 indicating the magnitude of the currently-outputtable active power from all of the multiple power conversion devices 6 by summing the active power values B2 of the multiple power conversion devices 6.

More specifically, the total output value calculation part 20 calculates the total active power value B1 using the formula $B1=B2a+B2b+\ldots+B2n$, wherein N is the number of the multiple power conversion devices 6, $B2a$ is the active power value B2 of the first power conversion device 6, $B2b$ is the active power value B2 of the second power conversion device 6, and B2$n$ is the active power value B2 of the Nth power conversion device 6. In other words, the total active power value B1 is the sum total of the active power values B2 of the multiple power conversion devices 6. The total output value calculation part 20 inputs the calculated total active power value B1 to the difference calculation part 22.

The difference calculation part 22 receives the input of the total active power value B1 from the total output value calculation part 20 and receives the input of a total upper limit command value A1 indicating the upper limit of the active power output from all of the multiple power conversion devices 6. In other words, the total upper limit command value A1 is a command value indicating the upper limit of the active power supplied from the solar power generation system 2 to the power system PS. For example, the total upper limit command value A1 is input to the control device 10 from a higher-level controller, etc. For example, the total upper limit command value A1 may be input to the control device 10 based on an operation of a manager of the solar power generation system 2, etc. The total upper limit command value A1 may be, for example, a preset constant value. The method for inputting the total upper limit command value A1 to the control device 10 is not limited to that described above and may be any method that can appropriately input the total upper limit command value A1 to the control device 10.

The difference calculation part 22 calculates a difference C1 between the total upper limit command value A1 and the total active power value B1 by subtracting the total active power value B1 from the total upper limit command value A1 that is input. In other words, the difference calculation part 22 calculates the difference C1 using the formula C1=A1−B1.

After the difference C1 is calculated, the difference calculation part 22 calculates a difference C2 per device of the multiple power conversion devices 6 by dividing the difference C1 by the number N of the multiple power conversion devices 6. In other words, the difference calculation part 22 calculates the difference C2 using the formula C2=C1/N. The difference calculation part 22 inputs the calculated difference C2 to the upper limit command value calculation part 24. In such a case, the number N of the multiple power conversion devices 6 is, more specifically, the number of the power conversion devices 6 currently operating among the multiple power conversion devices 6.

The upper limit command value calculation part 24 receives the input of the difference C2 from the difference calculation part 22 and receives the input of the active power values B2 of the multiple power conversion devices 6. As with the total output value calculation part 20, the multiple active power values B2 are input from the multiple power conversion devices 6, etc., to the upper limit command value calculation part 24.

The upper limit command value calculation part 24 calculates individual upper limit command values A2 indicating the upper limit of the active power individually output from each of the multiple power conversion devices 6 by adding the difference C2 to the active power values B2 of the multiple power conversion devices 6. Namely, the upper limit command value calculation part 24 calculates the individual upper limit command value A2 using the formula A2=B2+C2.

When the total upper limit command value A1 is greater than the total active power value B1, after the multiple individual upper limit command values A2 corresponding respectively to the multiple power conversion devices 6 are calculated, the upper limit command value calculation part 24 determines whether or not the multiple individual upper limit command values A2 are greater than designated parameters E1 of the multiple power conversion devices 6. In other words, the total upper limit command value A1 is greater than the total active power value B1 when the difference C1 and the differences C2 have positive values and the individual upper limit command values A2 are greater than the active power values B2. The designated parameters E1 are, for example, the rated outputs (the maximum values of the outputtable active power) of the power conversion devices 6.

When the individual upper limit command value A2 of the designated power conversion device 6 is determined to be greater than the designated parameter E1 of the power conversion device 6, the upper limit command value calculation part 24 modifies the value of the individual upper limit command value A2 of the power conversion device 6 to be the value of the parameter E1. In other words, the upper limit command value calculation part 24 replaces the value of the individual upper limit command value A2 of the power conversion device 6 with the value of the parameter E1 by setting A2=E1.

When the value of the individual upper limit command value A2 of the designated power conversion device 6 is modified to be the value of the parameter E1, the upper limit command value calculation part 24 corrects the total upper limit command value A1 by subtracting the value of the individual upper limit command value A2 (the value of the parameter E1) of the power conversion device 6 from the total upper limit command value A1 and calculates a total upper limit command value A3 after correction. In other words, the upper limit command value calculation part 24 calculates the total upper limit command value A3 after correction using the formula A3=A1−A2.

Also, when the value of the individual upper limit command value A2 of the designated power conversion device 6 is modified to be the value of the parameter E1, the upper limit command value calculation part 24 corrects the total active power value B1 by subtracting the active power value B2 of the power conversion device 6 from the total active power value B1 and calculates a total active power value B3 after correction. In other words, the upper limit command value calculation part 24 calculates the total active power value B3 after correction using the formula B3=B1−B2.

After the total upper limit command value A3 and the total active power value B3 are calculated, the upper limit command value calculation part 24 calculates a difference C3 after correction between the total upper limit command value A3 and the total active power value B3 by subtracting the total active power value B3 from the total upper limit command value A3. In other words, the upper limit command value calculation part 24 calculates the difference C3 after correction using the formula C3=A3−B3.

Also, the upper limit command value calculation part 24 calculates a number N' of the remaining power conversion devices 6 by subtracting, from the number N of the multiple power conversion devices 6, the number of the power conversion devices 6 for which the value of the individual upper limit command value A2 was modified to be the value of the parameter E1.

The upper limit command value calculation part 24 calculates a difference C2' per device of the remaining power conversion devices 6 by dividing the difference C3 after correction by the number N' of the remaining power conversion devices 6. In other words, the upper limit command value calculation part 24 calculates the difference C2' using the formula C2'=C3/N'.

After the difference C2' is calculated, the upper limit command value calculation part 24 recalculates the individual upper limit command value A2 for each of the remaining power conversion devices 6 by adding the difference C2' to the active power values B2 of the remaining power conversion devices 6. In other words, the upper limit command value calculation part 24 recalculates the individual upper limit command value A2 using the formula A2=B2+C2'.

When the total upper limit command value A1 is greater than the total active power value B1, the upper limit command value calculation part 24 repeats the processing described above until all of the multiple individual upper limit command values A2 of the multiple power conversion devices 6 are not more than the designated parameters E1. The undesirable setting of the individual upper limit command value A2 of the designated power conversion device 6 to have a value that is greater than the designated parameter E1 is suppressed thereby, and the amount of the output of the power conversion device 6 that is greater than the designated parameter E1 can be appropriately apportioned to another power conversion device 6.

On the other hand, when the total upper limit command value A1 is less than the total active power value B1, the upper limit command value calculation part 24 determines whether or not the multiple individual upper limit command values A2 are less than 0 after the multiple individual upper limit command values A2 corresponding respectively to the multiple power conversion devices 6 are calculated. In other words, the total upper limit command value A1 is less than the total active power value B1 when the difference C1 and the difference C2 have negative values and the individual upper limit command values A2 are less than the active power values B2.

When the individual upper limit command value A2 of a designated power conversion device 6 is determined to be less than 0, the upper limit command value calculation part 24 modifies the value of the individual upper limit command value A2 of the power conversion device 6 to be 0. In other words, the upper limit command value calculation part 24 replaces the value of the individual upper limit command value A2 of the power conversion device 6 with 0 by setting A2=0.

When the value of the individual upper limit command value A2 of the designated power conversion device 6 is modified to be 0, the upper limit command value calculation part 24 corrects the total active power value B1 by subtracting the active power value B2 of the power conversion device 6 from the total active power value B1 and calculates the total active power value B3 after correction. In other words, the upper limit command value calculation part 24 calculates the total active power value B3 after correction using the formula B3=B1-B2.

After the total active power value B3 is calculated, the upper limit command value calculation part 24 calculates the difference C3 after correction between the total upper limit command value A1 and the total active power value B3 by subtracting the total active power value B3 from the total upper limit command value A1. In other words, the upper limit command value calculation part 24 calculates the difference C3 after correction using the formula C3=A1-B3.

Also, the upper limit command value calculation part 24 calculates the number N' of the remaining power conversion devices 6 by subtracting, from the number N of the multiple power conversion devices 6, the number of the power conversion devices 6 for which the value of the individual upper limit command value A2 was modified to be 0.

The upper limit command value calculation part 24 calculates the difference C2' per device of the remaining power conversion devices 6 by dividing the difference C3 after correction by the number N' of the remaining power conversion devices 6. In other words, the upper limit command value calculation part 24 calculates the difference C2' using the formula C2'=C3/N'.

After the difference C2' is calculated, the upper limit command value calculation part 24 recalculates the individual upper limit command value A2 for each of the remaining power conversion devices 6 by adding the difference C2' to the active power values B2 of the remaining power conversion devices 6. In other words, the upper limit command value calculation part 24 recalculates the individual upper limit command value A2 using the formula A2=B2+C2'.

When the total upper limit command value A1 is less than the total active power value B1, the upper limit command value calculation part 24 repeats the processing described above until all of the multiple individual upper limit command values A2 of the multiple power conversion devices 6 are not less than 0. The undesirable setting of the individual upper limit command value A2 of the designated power conversion device 6 to be a value less than 0 is suppressed thereby, and the amount of the output of the power conversion device 6 can be appropriately apportioned to another power conversion device 6.

After the multiple individual upper limit command values A2 are calculated to be not more than the designated parameters E1 and not less than 0, the control device 10 controls the operations of the multiple power conversion devices 6 so that the active power output from each of the multiple power conversion devices 6 does not exceed the corresponding individual upper limit command value A2. Accordingly, active power having the appropriate magnitude corresponding to the total upper limit command value A1 can be supplied from the solar power generation system 2 to the power system PS.

For example, the control device 10 inputs the calculated multiple individual upper limit command values A2 to the corresponding multiple power conversion devices 6 to control the operations of the multiple power conversion devices 6 so that the active power output from the multiple power conversion devices 6 does not exceed the corresponding individual upper limit command values A2.

The control is not limited thereto; for example, the control device 10 may control the operations of the multiple power conversion devices 6 so that the active power output from each of the multiple power conversion devices 6 does not exceed the corresponding individual upper limit command value A2 by generating control signals corresponding to the individual upper limit command values A2 and by inputting the control signals to the power conversion devices 6. The control device 10 may directly input the individual upper limit command values A2 to the power conversion devices 6 or may input other control signals corresponding to the individual upper limit command values A2, etc., to the power conversion devices 6.

Figure 3:
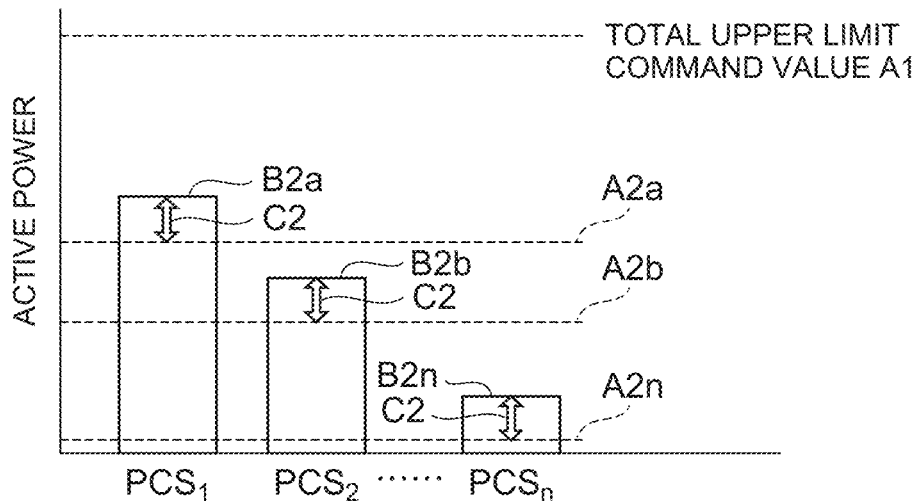
FIG. 3 is a graph schematically illustrating an example of an operation of the control device according to the embodiment.

FIG. 3 is a graph schematically illustrating an example of an operation of the control device according to the embodiment.

Figure 4:
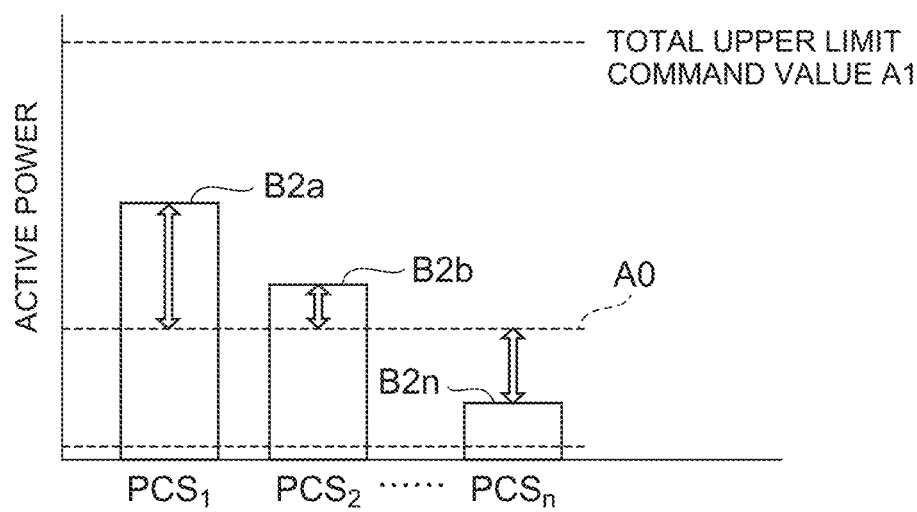
FIG. 4 is a graph schematically illustrating an example of an operation of a reference control device.

FIG. 4 is a graph schematically illustrating an example of an operation of a reference control device.

FIGS. 3 and 4 are bar charts illustrating the active power value B2 of the first power conversion device 6 ($PCS_1$) as B2a, the active power value B2 of the second power conversion device 6 ($PCS_2$) as B2b, and the active power value B2 of the Nth power conversion device 6 ($PCS_n$) as B2n.

FIG. 3 schematically illustrates an example in which, as described above, an individual upper limit command value A2a of the first power conversion device 6 is calculated by adding the difference C2 to the active power value B2a; an individual upper limit command value A2b of the second power conversion device 6 is calculated by adding the difference C2 to the active power value B2b; and an individual upper limit command value A2n of the Nth power conversion device 6 is calculated by adding the difference C2 to the active power value B2n.

FIG. 4 schematically illustrates an example of an operation of the reference control device when a common upper limit command value A0 for the multiple power conversion devices 6 is set by dividing the total upper limit command value A1 by the number N of the multiple power conversion devices 6.

In the example illustrated in FIG. 4, the outputs of the first power conversion device 6 and the second power conversion device 6 are undesirably limited to the upper limit command value A0. On the other hand, in the example illustrated in FIG. 4, the output of the Nth power conversion device 6 is less than the upper limit command value A0. Therefore, in the example illustrated in FIG. 4, for example, the output of the entire system is undesirably less than the total upper limit command value A1 by the amount of the difference between the upper limit command value A0 and the active power value B2n of the Nth power conversion device 6. In the example illustrated in FIG. 4, the output of the entire system is undesirably less than the total upper limit command value A1 despite the ample margin in the outputs of the first power conversion device 6 and the second power conversion device 6.

Thus, when the common upper limit command value A0 is set for the multiple power conversion devices 6, the total upper limit command value A1 that is less than the total active power value B1 may be set, and when the solar radiation of the multiple solar cell panels 4 has bias, etc., the total value of the active power of the AC power supplied from the multiple power conversion devices 6 to the power system PS may be undesirably limited more than necessary.

In contrast, the control device 10 of the solar power generation system 2 according to the embodiment calculates the individual upper limit command values A2 of the multiple power conversion devices 6 by adding the difference C2 to the active power values B2 of the multiple power conversion devices 6.

Accordingly, for example, as illustrated in FIG. 3, the individual upper limit command value A2 having the appropriate magnitude corresponding to each active power value B2 can be set for each of the multiple power conversion devices 6 even when the active power values B2 of the multiple power conversion devices 6 have bias. In other words, the total upper limit command value A1 can be appropriately apportioned to the multiple power conversion devices 6.

Accordingly, even when the total upper limit command value A1 that is less than the total active power value B1 is set and the solar radiation of the multiple solar cell panels 4 has bias, etc., the excessive limitation of the total value of the active power of the AC power supplied from the multiple power conversion devices 6 to the power system PS can be suppressed.

For example, compared to when the common upper limit command value A0 is set for the multiple power conversion devices 6, the total value of the active power of the AC power supplied from the multiple power conversion devices 6 to the power system PS can approach the total upper limit command value A1. For example, unutilized generated power can be suppressed thereby. Also, for example, a reduction of the electricity sales income of the solar power generation system 2 business can be suppressed.

Although several embodiments of the invention are described, these embodiments are presented as examples and are not intended to limit the scope of the invention. These novel embodiments may be carried out in other various forms; and various omissions, substitutions, and modifications can be performed without departing from the spirit of the invention. Such embodiments and their modifications are within the scope and spirit of the invention and are included in the invention described in the claims and their equivalents.

REFERENCE SIGNS LIST

2 solar power generation system, 4 solar cell panel, 6 power conversion device, 10 control device, 12, 14 transformers, 20 total output value calculation part, 22 difference calculation part, 24 upper limit command value calculation part

The invention claimed is:
1. A solar power generation system, comprising:
a plurality of solar cell panels;
a plurality of power conversion devices provided to correspond respectively to the plurality of solar cell panels, the plurality of power conversion devices converting direct current power supplied from the plurality of solar cell panels into alternating current power corresponding to a power system, the plurality of power conversion devices supplying, to the power system, the alternating current power after the conversion; and
a control device controlling conversion operations of power of the plurality of power conversion devices,
the control device including
a total output value calculation part that
receives an input of an active power value indicating a magnitude of currently-outputtable active power for each of the plurality of power conversion devices, and
calculates a total active power value by summing the active power values of the plurality of power conversion devices, the total active power value indicating a magnitude of currently-outputtable active power from all of the plurality of power conversion devices,
a difference calculation part that
receives an input of the total active power value,
receives an input of a total upper limit command value indicating an upper limit of active power output from all of the plurality of power conversion devices,
calculates a difference between the total upper limit command value and the total active power value, and calculates a difference per device of the plurality of power conversion devices by dividing the difference by a number of the plurality of power conversion devices, and an upper limit command value calculation part that receives an input of the difference per device, receives an input of the active power values of the plurality of power conversion devices, and calculates individual upper limit command values by adding the difference per device to the active power values of the plurality of power conversion devices, the individual upper limit command values indicating upper limits of the active power individually output respectively from the plurality of power conversion devices, the control device controlling an operation of each of the plurality of power conversion devices so that the active power output from each of the plurality of power conversion devices does not exceed the corresponding individual upper limit command value.

2. The solar power generation system according to claim 1, wherein when the individual upper limit command value of a designated power conversion device among the plurality of power conversion devices is greater than a designated parameter of the designated power conversion device, the upper limit command value calculation part modifies a value of the individual upper limit command value of the designated power conversion device to be a value of the designated parameter.

3. The solar power generation system according to claim 2, wherein when the value of the individual upper limit command value of the designated power conversion device is modified to be the value of the designated parameter, the upper limit command value calculation part:

calculates a total upper limit command value after correction by subtracting the value of the individual upper limit command value of the designated power conversion device from the total upper limit command value;

calculates a total active power value after correction by subtracting the active power value of the designated power conversion device from the total active power value;

calculates a difference after correction between the total upper limit command value after correction and the total active power value after correction;

calculates a number of remaining power conversion devices by subtracting, from the number of the plurality of power conversion devices, a number of the power conversion devices for which the value of the individual upper limit command value was modified to be the value of the designated parameter, calculates a difference per device of the remaining power conversion devices by dividing the difference after correction by the number of the remaining power conversion devices, and recalculates the individual upper limit command value for each of the remaining power conversion devices by adding the difference per device of the remaining power conversion devices to the active power value of each of the remaining power conversion devices.

4. The solar power generation system according to claim 1, wherein when the individual upper limit command value of a designated power conversion device among the plurality of power conversion devices is less than 0, the upper limit command value calculation part modifies a value of the individual upper limit command value of the designated power conversion device to be 0.

5. The solar power generation system according to claim 4, wherein when the value of the individual upper limit command value of the designated power conversion device is modified to be 0, the upper limit command value calculation part:

calculates a total active power value after correction by subtracting the active power value of the designated power conversion device from the total active power value;

calculates a difference after correction between the total upper limit command value and the total active power value after correction;

calculates a number of remaining power conversion devices by subtracting, from the number of the plurality of power conversion devices, a number of the power conversion devices for which the value of the individual upper limit command value was modified to be 0;

calculates a difference per device of the remaining power conversion devices by dividing the difference after correction by the number of the remaining power conversion devices; and recalculates the individual upper limit command value for each of the remaining power conversion devices by adding the difference per device of the remaining power conversion devices to the active power value of each of the remaining power conversion devices.

6. A control device controlling conversion operations of power of a plurality of power conversion devices, the plurality of power conversion devices being provided to correspond respectively to a plurality of solar cell panels, the plurality of power conversion devices converting direct current power supplied from the plurality of solar cell panels into alternating current power corresponding to a power system, the plurality of power conversion devices supplying, to the power system, the alternating current power after the conversion, the control device comprising:

a total output value calculation part that receives an input of an active power value indicating a magnitude of currently-outputtable active power for each of the plurality of power conversion devices, and calculates a total active power value by summing the active power values of the plurality of power conversion devices, the total active power value indicating a magnitude of currently-outputtable active power from all of the plurality of power conversion devices;

a difference calculation part that receives an input of the total active power value, receives an input of a total upper limit command value indicating an upper limit of active power output from all of the plurality of power conversion devices, calculates a difference between the total upper limit command value and the total active power value, and calculates a difference per device of the plurality of power conversion devices by dividing the difference by a number of the plurality of power conversion devices; and an upper limit command value calculation part that receives an input of the difference per device, receives an input of the active power values of the plurality of power conversion devices, and calculates individual upper limit command values by adding the difference per device to the active power values of the plurality of power conversion devices, the individual upper limit command values indicating upper limits of the active power individually output respectively from the plurality of power conversion devices, the control device controlling an operation of each of the plurality of power conversion devices so that the active power output from each of the plurality of power conversion devices does not exceed the corresponding individual upper limit command value.

* * * * *